US010656247B2

(12) United States Patent
Mizutani

(10) Patent No.: US 10,656,247 B2
(45) Date of Patent: May 19, 2020

(54) TARGET DETECTION APPARATUS FOR DETECTING LOW-LEVEL TARGET AND TARGET DETECTION METHOD FOR DETECTING THE SAME

(71) Applicant: DENSO CORPORATION, Kariya, Aichi-pref. (JP)

(72) Inventor: Akiyoshi Mizutani, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 463 days.

(21) Appl. No.: 15/304,814

(22) PCT Filed: Apr. 15, 2015

(86) PCT No.: PCT/JP2015/061620
§ 371 (c)(1),
(2) Date: Oct. 17, 2016

(87) PCT Pub. No.: WO2015/159924
PCT Pub. Date: Oct. 22, 2015

(65) Prior Publication Data
US 2017/0045610 A1 Feb. 16, 2017

(30) Foreign Application Priority Data
Apr. 18, 2014 (JP) .................. 2014-086495

(51) Int. Cl.
*G01S 7/41* (2006.01)
*G01S 13/93* (2020.01)
(Continued)

(52) U.S. Cl.
CPC ............. *G01S 7/411* (2013.01); *G01S 13/931* (2013.01); *G08G 1/165* (2013.01); *G08G 1/166* (2013.01);
(Continued)

(58) Field of Classification Search
CPC .......... G01S 7/411; G01S 7/41; G01S 13/931; G01S 13/34; G01S 2013/9353; G01S 2013/462; G08G 1/166; G08G 1/165
See application file for complete search history.

(56) References Cited

U.S. PATENT DOCUMENTS 8,149,158 B2* 4/2012 Samukawa ........... G01S 13/345
342/105
9,606,225 B2* 3/2017 Okita .................... G01S 13/931
(Continued)

*Primary Examiner* — Matthew M Barker
(74) *Attorney, Agent, or Firm* — Knobbe, Martens, Olson & Bear, LLP

(57) ABSTRACT

A target detection apparatus includes a target detection means, a depth determination value calculation means, a crossing over determination means, an attention information setting means, a tracking means, a transfer determination value calculation means, and an attention information cancelling means. The depth determination value calculation means determines a depth determination value indicating the depth of a target. The crossing over determination means determines whether the target can be crossed over by the vehicle. The attention information setting means sets attention information indicating that the target needs to be paid attention. The tracking means determines a connection relationship between a current-cycle target and a previous-cycle target and cause the current-cycle target having a connection relationship, to adopt information relating to the previous-cycle target. The transfer determination value calculation means determines a transfer determination value, for each target. The attention information cancelling means cancels the setting of the attention information.

9 Claims, 10 Drawing Sheets

(51) Int. Cl.
 *G08G 1/16* (2006.01)
 *G01S 13/931* (2020.01)
 *G01S 13/34* (2006.01)
 *G01S 13/46* (2006.01)
(52) U.S. Cl.
 CPC ......... *G01S 13/34* (2013.01); *G01S 2013/462* (2013.01)

(56) References Cited

U.S. PATENT DOCUMENTS

| | | |
|---|---|---|
| 2011/0006941 A1 | 1/2011 | Samukawa et al. |
| 2015/0032363 A1* | 1/2015 | Itoh ................ G01S 13/931 701/301 |
| 2015/0362592 A1 | 12/2015 | Mizutani et al. |

* cited by examiner (LOW-LEVEL TARGET)

(ATTENTION TARGET)

TARGET DETECTION APPARATUS FOR DETECTING LOW-LEVEL TARGET AND TARGET DETECTION METHOD FOR DETECTING THE SAME

CROSS-REFERENCE TO RELATED APPLICATION

This application is based on and claims the benefit of priority from earlier Japanese Patent Application No. 2014-86495 filed Apr. 18, 2014, the description of which is incorporated herein by reference.

BACKGROUND OF THE INVENTION

Technical Field

The present disclosure relates to a technique for identifying a target which is present in the vicinity of a vehicle.

Background Art

On-vehicle radar apparatuses have been used to transmit and receive a radar wave to detect information relating to a target (distance, relative speed, azimuth, and the like relative to the target) that has reflected the radar wave. For example, an on-vehicle radar apparatus is disclosed in JP-A-2011-017634. According to the disclosure well known, when a target is detected over a plurality of measurement cycles, the apparatus estimates the height of the target from the road surface, on the basis of the distribution (generation pattern of null points) of the received power.

In a generation pattern of null points, usually, the generation interval of null points becomes larger as the height from the road surface becomes smaller. In the case of a road surface object made of metal, such as a manhole, embedded in the road surface (hereinafter also referred to as low-level target), no null point is generated. However, as shown in FIGS. 10A and 10B, when a vehicle traveling a downward slope detects a low-level target on a horizontal road surface ahead of the vehicle, or when a vehicle traveling a horizontal road surface detects a low-level target set up on an upward slope ahead of the vehicle, the distribution of the received power is equivalent to that of a target having a height from the road surface (attention target that needs to be paid attention under the control such as of drive assist). In other words, in such a case, the low-level target is erroneously recognized as an attention target.

In contrast, whether a target is a low-level target or an attention target may be identified on the basis of the depth of the target determined from the distribution of reflection points, i.e. points that have reflected the radar wave. That is, a low-level target, such as a manhole, detected on an ordinary road is detected as an object having only a small depth since the size of the target in a depth direction as viewed from the vehicle is less than one meter at the most. On the other hand, other obstacles are also detected on a road, or particularly vehicles are detected as representatives of obstacles. In such a vehicle, the radar wave is reflected not only on the rear end surface of the vehicle, but also on an object inside the vehicle compartment after the radar wave's passing through the glass, or on the bottom surface of the vehicle body after the radar wave's reaching under the vehicle body. Therefore, the vehicle is detected as an object having a depth (see FIG. 4A). FIG. 4A is a result of fast Fourier transform of the reflected radar wave. The peak circled in the figure corresponds to a detected object.

CITATION LIST

Patent Literature

Patent Literature 1: JP-A-2011-017634

An on-vehicle radar apparatus performs a tracking process for determining whether there is a connection relationship between targets (whether both targets are identical). In this case, the targets refer to a current-cycle target (i.e., a target detected in the latest measurement cycle, among the targets repeatedly detected at predetermined measurement cycle) and a previous-cycle target (i.e., a target detected in the previous measurement cycle). In the process, the information relating to the previous-cycle target is adopted by the current-cycle target which has been determined to have a connection relationship with the previous-cycle target. Accordingly, a target that has been determined as an attention target is recognized as an attention target while the target is being detected.

However, when different targets are present being close to each other, there has been a problem of so-called transfer. In the occurrence of transfer, both targets are erroneously determined to have a connection relationship therebetween, and wrong information is adopted. Thus, the target, which is in fact a low-level target, is erroneously recognized as an attention target.

For example, considering a scene where the vehicle travels towards a bridge, a metal plate that is a joint to the bridge and set up on the road surface is a target that should be detected as a low-level target, and a parapet built up at an edge of the bridge is a target that should be detected as a high target. The parapet can be detected from a relatively distanced position, however, the metal plate cannot be detected unless the vehicle approaches it to some extent. Therefore, when the metal plate is newly detected in a state where the parapet has firstly been detected as a high target, both targets may be determined to have a connection relationship. This is because both targets are stationary objects and present being close to each other. In this case, the metal plate is recognized as an attention target because the metal plate adopts the information of the parapet.

SUMMARY

Hence it is desired to provide a technique for improving the accuracy of determining whether a target is a low-level target that can be crossed over by the vehicle.

A target detection apparatus of the present disclosure includes a target detection means, a depth determination value calculation means, a crossing over determination means, an attention information setting means, a tracking means, a transfer determination value calculation means, and an attention information cancelling means.

The target detection means detects a target that is present in the vicinity of the vehicle from a result detected by a radar sensor that transmits and receives a radar wave to detect a position and a speed of a reflection point that has reflected a radar wave, for each measurement cycle set in advance. The depth determination value calculation means determines a depth determination value indicating the depth of a target detected by the target detection means. The crossing over determination means determines whether the target can be crossed over by the vehicle, according to the depth determination value calculated by the depth determination value calculation means. The attention information setting means sets attention information indicating that the target needs to be paid attention as one piece of information relating to the target, when the crossing over determination means determines that crossing over is not possible. The tracking means executes a tracking process, with a target detected by the target detection means in a latest measurement cycle being taken as a current-cycle target, and a target detected by the target detection means in a previous measurement cycle being taken as a previous-cycle target to determine presence/absence of a connection relationship between the current-cycle target and the previous-cycle target and cause the current-cycle target, which has been determined to have a connection relationship with the previous-cycle target, to adopt information relating to the previous-cycle target. The transfer determination value calculation means determines a transfer determination value indicating a size of a predetermined determination object amount measured after the crossing over determination means finally determines that crossing over is not possible, for each target after the tracking process. The attention information cancelling means cancels the setting of the attention information when the transfer determination value calculated by the transfer determination value calculation means exceeds a preset grace threshold, for a target that has adopted the information from the previous-cycle target in which the attention information has been set.

With this configuration, the depth determination value can be used as a basis to determine whether the target, such as a manhole, is one (low-level target) that can be crossed over, or whether the target, such as a roadside object, is one (attention target) that cannot be crossed over or a vehicle. In addition to this, if the target is determined to be an attention target and if there is a high probability that erroneous information has been adopted due to so-called transfer which occurs between an attention target and a low-level target that are close to each other, the setting as being an attention target can be cancelled using the transfer determination value. Thus, accuracy is improved in determining whether the target is a low-level target. Further, reliability is improved in various of controls executed based on the result of the determination.

The bracketed reference signs in the claims indicate the correspondency to the specific means in the embodiment described later as a mode, and should not be construed as limiting the technical scope of the present disclosure.

In addition to the target detection apparatus and the target detection method described above, the present disclosure can be achieved in various modes, such as a vehicle control system including the target detection apparatus as a component, a program for functioning a computer as the various means configuring the target detection apparatus, or the like.

DETAILED DESCRIPTION OF PREFERRED EMBODIMENTS

With reference to the drawings, embodiments of the present disclosure will be described.

[Overall Configuration]

Figure 1:
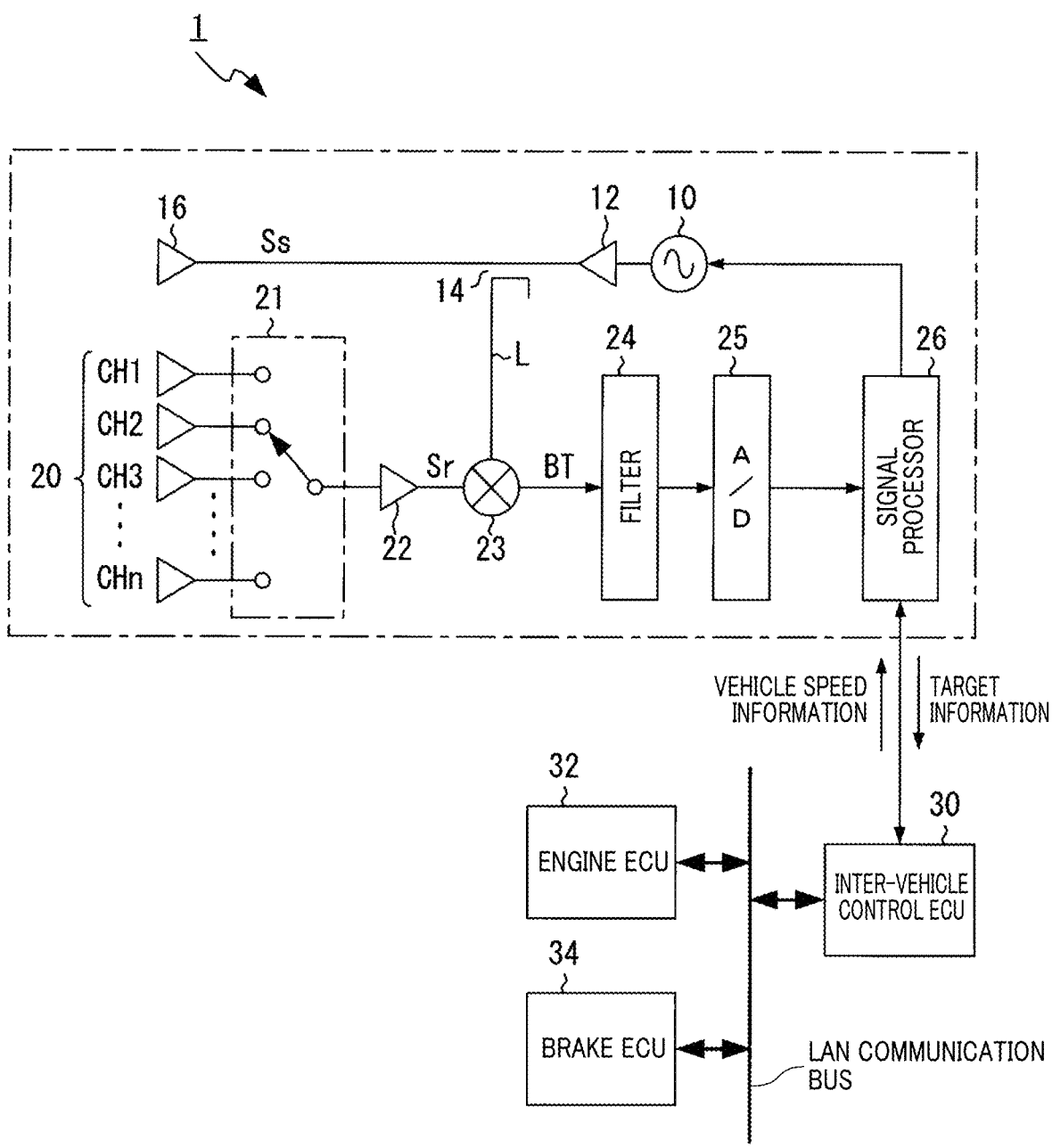
FIG. 1 is a block diagram illustrating a configuration of a vehicle control system.

A vehicle control system to which the present disclosure is applied is mounted on a vehicle, and includes, as shown in FIG. 1, an inter-vehicle control electronic control unit (hereinafter referred to as an "inter-vehicle control ECU") 30, an engine electronic control unit (hereinafter referred to as an "engine ECU") 32, and a brake electronic control unit (hereinafter referred to as a "brake ECU") 34. These components are connected with one another via a LAN communication bus. Also, the ECUs 30, 32 and 34 are each configured mainly of a well-known microcomputer and include at least a bus controller for performing communication via the LAN communication bus.

The inter-vehicle control ECU 30 is connected to a warning buzzer, a cruise control switch, a target inter-vehicle distance setting switch, and the like (not shown), and also connected to a radar sensor 1.

The radar sensor 1 is configured as a so-called "millimeter wave radar" based on frequency modulated continuous wave (FMCW). By transmitting and receiving the frequency-modulated radar wave of the millimeter wave band, the radar sensor 1 recognizes a target, such as a preceding vehicle or a roadside object, and generates target information regarding the recognized target (hereinafter referred to as "recognized target") to transmit the target information to the inter-vehicle control ECU 30.

The target information includes a distance to a recognized target, a relative speed, an azimuth in which the recognized target is positioned, a probability of collision, an estimate of the size (height and width) of the recognized target when it has a high possibility of collision, and the like.

[Configuration of Brake ECU]

The brake ECU 34 is configured to transmit a brake pedal state to the inter-vehicle control ECU 30. The brake pedal state is determined based on information from an M/C pressure sensor, not shown, as well as detection information from a steering sensor and a yaw rate sensor (steering angle and yaw rate), not shown. The brake ECU 34 is also configured to receive a target acceleration, a brake request, and the like from the inter-vehicle control ECU 30. According to the received information and the determined brake state, the brake ECU 34 is configured to control braking force by driving a brake actuator that opens/closes a pressure increase control valve and a pressure decrease control valve provided to a brake hydraulic circuit.

[Configuration of Engine ECU]

The engine ECU 32 is configured to transmit detection information from a vehicle speed sensor, a throttle position sensor, and an accelerator pedal opening sensor (vehicle speed, engine control state, and accelerator operation state), not shown, to the inter-vehicle control ECU 30, and receive a target acceleration, a fuel cut request, and the like from the inter-vehicle control ECU 30. According to the operation state specified by the received information, the engine ECU 32 is configured to output a drive command to the throttle actuator and the like that adjust the throttle position of the internal combustion engine.

[Configuration of Inter-Vehicle Control ECU]

The inter-vehicle control ECU 30 receives a vehicle speed and an engine control state from the engine ECU 32, and also receives a steering angle, a yaw rate, a brake control state, and the like from the brake ECU 34. Further, the inter-vehicle control ECU 30 transmits control commands to the engine ECU 32 and the brake ECU 34 on the basis of values set by the cruise control switch, the target inter-vehicle distance setting switch, and the like, and the target information received from the radar sensor 1. The control commands are used for adjusting the inter-vehicle distance to the preceding vehicle to a suitable distance. As the control commands, the inter-vehicle control ECU 30 transmits a target acceleration, a fuel cut request, and the like to the engine ECU 32, and transmits a target acceleration, a brake request, and the like to the brake ECU 34. Also, the inter-vehicle control ECU 30 is configured to determine generation of an alarm, and sound an alarm buzzer as necessary.

[Configuration of Radar Sensor]

Details of the radar sensor 1 will now be described.

The radar sensor 1 includes an oscillator 10, an amplifier 12, a distributor 14, a transmitting antenna 16, and a receiving-antenna unit 20. The oscillator 10 generates a high-frequency signal of a millimeter wave band modulated so as to have an ascending section in which the frequency linearly increases with time and a descending section in which the frequency linearly decreases with time. The amplifier 12 amplifies a high-frequency signal generated by the oscillator 10. The distributor 14 distributes power of an output of the amplifier 12 to a transmission signal Ss and a local signal L. The transmitting antenna 16 radiates a radar wave according to the transmission signal Ss. The receiving-antenna unit 20 is made up of n receiving antennas that receive the radar wave.

The radar sensor 1 includes a receiving switch 21, an amplifier 22, a mixer 23, a filter 24, an A/D converter 25, and a signal processor 26. The receiving switch 21 sequentially selects any of the antennas configuring the receiving-antenna unit 20, and supplies a received signal Sr from the selected antenna to a subsequent stage. The amplifier 22 amplifies the received signal Sr supplied from the receiving switch 21. The mixer 23 mixes the received signal Sr amplified by the amplifier 22 with the local signal L to generate a beat signal BT. The filter 24 removes unwanted signal components from the beat signal BT generated by the mixer 23. The A/D converter 25 samples an output of the filter 24, and converts the sampled output into digital data. The signal processor 26 activates or deactivates the oscillator 10, and controls the sampling of the beat signal BT via the A/D converter 25. At the same time, the signal processor 26 processes signals using the sampled data or communicates with the inter-vehicle control ECU 30, and transmits/receives information (vehicle speed information) necessary for signal processing and information (target information or the like) obtained as a result of the signal processing.

Each antenna configuring the receiving-antenna unit 20 is set such that a beam width of the antenna includes the overall beam width of the transmitting antenna 16. The respective antennas are assigned to CH1 to CHn.

The signal processor 26 is configured mainly of a well-known microcomputer and includes a processing unit (e.g., a digital signal processor (DSP)) used for executing a fast Fourier transform (FFT) process or the like, for the data retrieved via the A/D converter 25.

[Operation of Radar Sensor]

In the radar sensor 1 of the present embodiment configured as described above, when the oscillator 10 is activated according to a command from the signal processor 26, the distributor 14 distributes power of the high-frequency signal generated by the oscillator 10 and amplified by the amplifier 12. Accordingly, a transmission signal Ss and a local signal L are generated, and the transmission signal Ss is transmitted as a radar wave via the transmitting antenna 16.

Then, a returned reflected wave transmitted from the transmitting antenna 16 and reflected on an object is received by all of the receiving antennas that configure the receiving-antenna unit 20. Only the received signal Sr of a reception channel CHi (i=1 to n) selected by the receiving switch 21 is amplified by the amplifier 22 and then supplied to the mixer 23. Then, the mixer 23 generates a beat signal BT by mixing a local signal L from the distributor 14 into the received signal Sr. After the unwanted signal components have been removed by the filter 24, the beat signal BT is sampled by the A/D converter 25, and retrieved by the signal processor 26.

The receiving switch 21 is switched so that all of the channels CH1 to CHn are selected for a predetermined number of times (e.g., 512 times) during one modulation cycle of radar wave. Further, the A/D converter 25 performs sampling in synchronization with the timing of such switching. In other words, during one modulation cycle of radar wave, the sampled data is accumulated for each of the channels CH1 to CHn and for each of the ascending/descending sections of the radar wave.

[Signal Processor]

Next, processes performed in the signal processor 26 will be described.

A ROM provided to the signal processor 26 at least stores a null point generation pattern map necessary for executing processes described below, as well as programs for the processes.

<Main Process>

Figure 2:
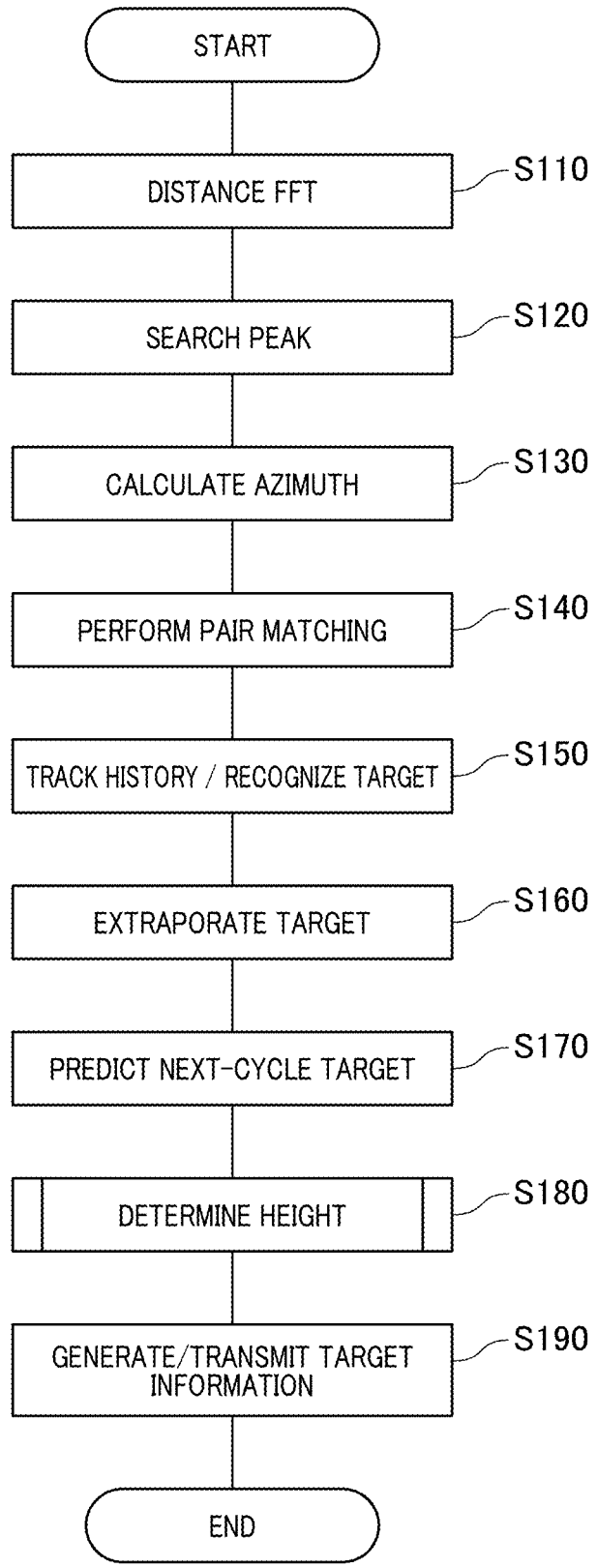
FIG. 2 is a flowchart illustrating a main process executed by a signal processor.

A main process executed by the signal processor 26 will be described with reference to the flowchart shown in FIG. 2.

The process is repeatedly activated and executed, with one modulation cycle of radar wave as being a measurement cycle.

When the process is activated, a frequency analysis process (FFT process herein) is executed, in S110, for sampled data of one modulation cycle accumulated during the previous measurement cycle, and then a power spectrum of a beat signal BT is calculated for each of the channels CH1 to CHn and for each of the ascending/descending sections of the radar wave.

In S120, the signal processor 26 performs peak search to extract a frequency component of a peak (hereinafter referred to as a "peak frequency component") in the power spectrum obtained in S110. The peak frequency components extracted through the peak search include a component that matches a value predicted in S180 described later and components other than the above. If there is no peak frequency component that matches the predicted value, such a peak frequency component is regarded to be hidden in noise or other peak frequency components, thereby extrapolating the peak frequency components.

The term "match" refers to that the peak frequency component is within an allowable range set in advance. Further, the signal level of an extrapolated peak frequency component is set to zero or to the noise level.

In S130, the signal processor 26 performs an azimuth calculation process to determine an incoming direction of a reflected wave that has produced the peak frequency for each peak frequency component extracted in S120 (excluding however the extrapolated components) and for each modulation section. Specifically, the signal processor 26 performs a frequency analysis process (FFT process or a super resolution method, such as MUSIC (multiple signal classification), herein) for n peak frequency components of the same frequency collected from the channels CH1 to CHn.

In S140, the signal processor 26 performs pair matching to set a combination of a peak frequency component in ascending modulation and a peak frequency component in descending modulation extracted in S120. Specifically, the signal processor 26 combines the peak frequency components extracted in step S120 whose signal levels and incoming directions calculated in S130 substantially match each other (combines those which have a difference therebetween equal to or less than a matching threshold set in advance). Further, the signal processor 26 calculates a distance and a relative speed for each combination that has been set using a well-known technique in the FMCW radar, and registers only a combination that has a calculated distance and a calculated speed smaller/lower than an upper limit distance and an upper limit speed set in advance, respectively, as a formal pair (i.e., as a reflection point of radar wave).

In S150, for each pair registered in S140 of the current measurement cycle (hereinafter referred to as "current-cycle pair"), the signal processor 26 performs a history tracking process to determine whether the current-cycle pair indicates a target identical to one indicated by the pair registered in S140 of the previous measurement cycle (hereinafter referred to as "previous-cycle pair") (determines whether there is a historical connection therebetween).

Specifically, based on information of the previous-cycle pair, the signal processor 26 calculates a predicted position and a predicted speed of the present-cycle pair corresponding to the previous-cycle pair. Then, if the differences of the predicted position and the predicted speed (positional difference and speed difference) from a detected position and a detected speed, respectively, calculated from the current-cycle pair, are smaller than upper limit values (upper limit positional difference and upper limit speed difference) set in advance, it is determined that there is a historical connection. Accordingly, the pair determined as having a historical connection over a plurality of measurement cycles (e.g., five cycles) is recognized as a target. The current-cycle pair sequentially adopts the information of the previous-cycle pair (e.g., information related to the number of times of historical connection, an extrapolation counter and an extrapolation flag described later, as well as characteristics of the target expressed by the pair) having a historical connection with the current-cycle pair.

In S160, taking the target recognized in S150 of the current cycle as a current-cycle target, and taking the target recognized in S150 of the previous cycle as a previous-cycle target, the signal processor 26 creates an extrapolation pair if there is a previous-cycle target having no historical connection with the current-cycle target, on the basis of the predicted value of the previous-cycle target, and then executes a target extrapolation process to add the extrapolation pair to the current-cycle target.

Each current-cycle target is set with an extrapolation flag indicating presence/absence of extrapolation, and an extrapolation counter indicating the number of times of continuously performed extrapolation. If the current-cycle target is an actual pair that has been actually detected, the extrapolation flag GF and the extrapolation counter are cleared to zero. If the current-cycle target is an extrapolation pair, the extrapolation flag GF is set to one and the extrapolation counter is incremented. Thereafter, if the count of the extrapolation counter reaches a deletion threshold set in advance, the target is deleted, being regarded to be lost.

In S170, the signal processor 26 performs a subsequent-cycle target predicting process to determine a peak frequency to be detected and an azimuth angle to be detected in the subsequent cycle, for each of the current-cycle targets registered in S150 and S160.

In S180, the signal processor 26 performs a height determination process to determine the height of a stationary target, on the basis of the information acquired in S110 to S170 described above and the vehicle speed information acquired from the inter-vehicle control ECU 30. In the subsequent S190, the signal processor 26 generates target information including the speed, position, azimuth angle, and height estimated in S180 of the target, for each target that has been recognized, for transmission to the inter-vehicle control ECU 30, and terminates the process.

[Height Determination]

Figure 3:
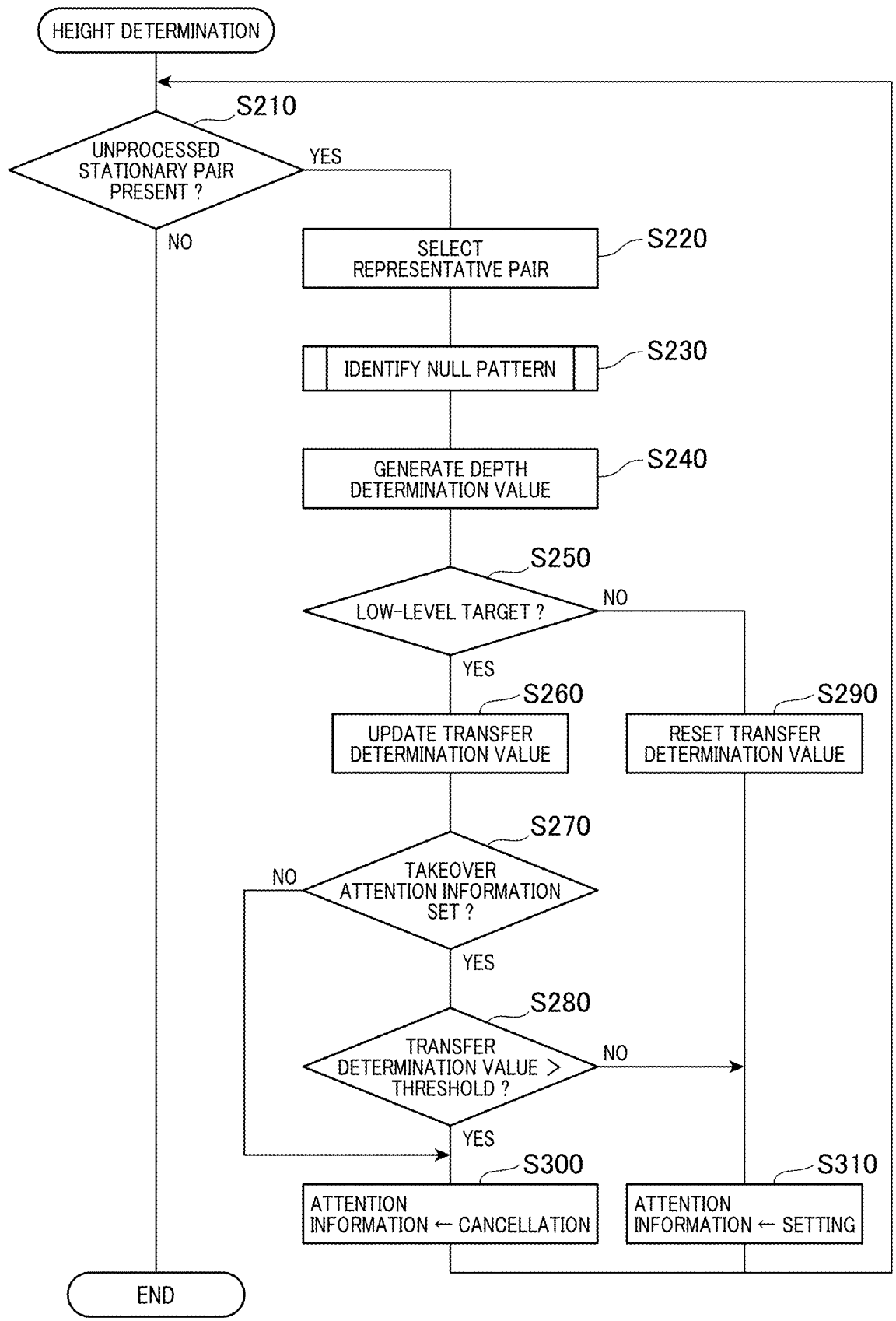
FIG. 3 is a flowchart illustrating a height determination process.

Next, with reference to a flowchart shown in FIG. 3, a height determination process performed in S180 will be described.

In the present process, in S210 first, taking a pair that has been determined to have a historical connection over a plurality of cycles and is stationary (e.g., a pair having a speed of ±5 km/h relative to the own vehicle speed) as a stationary pair, the signal processor 26 determines whether there is any stationary pair not yet subjected to processes of S220 and S230 described later. If there is no unprocessed stationary pair (S210: NO), the present process is terminated.

On the other hand, if unprocessed stationary pairs are present (S210: YES), in S220, a pair that satisfies a representation condition is selected from among the unprocessed stationary pairs, as a representative pair. Herein, a pair being at a position closest to the own vehicle is used as the representation condition.

Then, in S230, the signal processor 26 performs a null pattern identification process using a null point generation pattern map prepared in advance to estimate the height of the target expressed by the representative pair. In the null point generation pattern map, a distance from the own vehicle to a target (e.g., 0 to 100 m) is divided into a plurality of regions. If the region concerned includes at least one null point minimizing the received power of the reflected wave that has been affected by a multipath, 1 is set as a map value, and if the region includes no null point, 0 is set as a map value. Herein, the height from the road surface (e.g., 0 to 350 cm) is divided into predetermined ranges (e.g., of 10 cm), and a pattern is stored for each of the ranges. Details of the null point generation pattern map, and the process for estimating the height of the target using the null point generation pattern map are known techniques as disclosed in prior art documents, and therefore the description is omitted herein.

Figure 4A:
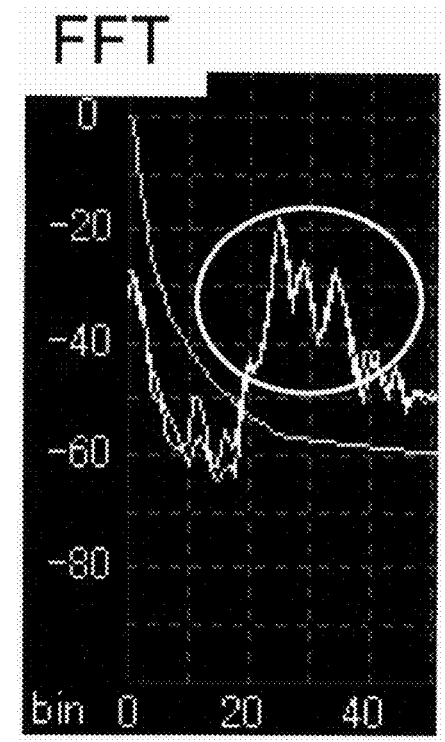
FIG. 4A is a graph illustrating a shape of a peak based on a wave reflected from a target having a depth.
Figure 4B:
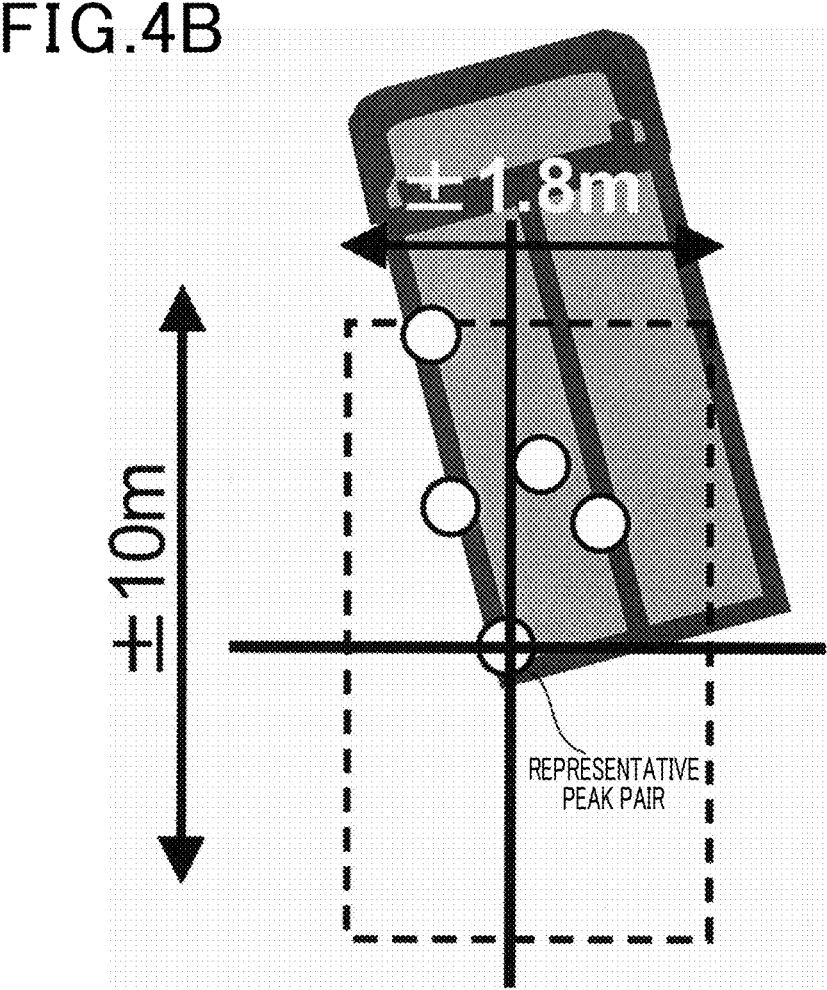
FIG. 4B shows a diagram illustrating a reflection point of a target having a depth, and illustrating conditions used when determining a representative pair and a depth determination value.

Then, in S240, a depth determination value of the representative pair is generated. Specifically, the number of stationary pairs (identical object pairs) that are present in an identification recognition range and satisfy an identification target condition is taken as a depth determination value. The identification recognition range and the identification target condition are set in advance to select a stationary pair attributing to an object identical with a representative pair. In the identification recognition range used, the difference in vertical position from the representative pair is within a preset vertical position selection determination value range (e.g., ±10 m), and the difference in lateral position from the representative pair is within a preset lateral position selection determination value range (e.g., ±1.8 m) (see FIG. 4B). In the identification target condition used, the difference in relative speed from the representative pair is within an identification determination value range (e.g., ±5 km/h).

Then, in S250, it is determined whether the target expressed by the representative pair is a low-level target that can be crossed over by the vehicle. Specifically, if the height of the target is determined to be equal to or less than the predetermined threshold as a result of the null pattern identification process in S230 or if the depth determination value is determined to be less than a low-level threshold (e.g., 1), the target is determined to be a low-level target.

If it is determined, in S290, that the target expressed by the representative pair is not a low-level target (S250: NO), a transfer determination value indicating the travel distance of the own vehicle is reset. Then, in step S310, attention information is set as information relating to the target expressed by the representative pair, and the process returns to S210. In other words, the target to which attention information has been set indicates that the target has a height that cannot be crossed over by the vehicle and should be paid attention in drive assist control or the like (hereinafter referred to as an "attention target").

On the other hands, if it is determined, in S260, that the target expressed by the representative pair is a low-level target (S250: YES), the transfer determination value is updated. Specifically, based on the vehicle speed information or the like acquired separately, the travel distance of the own vehicle from the previous measurement cycle to the current measurement cycle is calculated, and the calculated travel distance is added to a stored value of the transfer determination value to thereby update the transfer determination value. In other words, the transfer determination value indicates a travel distance of the own vehicle measured starting from a time point when the target is finally determined not to be a low-level target in S250.

In the subsequent S270, if the information is adopted by the representative pair in S150, it is determined whether attention information (hereinafter referred to as "takeover attention information") has been set in the takeover information.

If takeover attention information has been set (S270: YES), that is, if there is any difference in the attention information setting/canceling state between the determination result in S250 and the takeover information, it is determined, in S280, whether the transfer determination value obtained in S260 is larger than the preset transfer determination value.

If the transfer determination value is equal to or less than the transfer determination value (S280: NO), the process proceeds to S310. In S310, regardless of the determination result in S250, attention information is set as the information relating to the target expressed by the representative pair, and the process returns to S210.

On the other hand, if the information has not been adopted in S150 or the takeover attention information is in a canceled state (S270: YES), or if the transfer determination value is larger than the transfer determination value (S280: YES), the process proceeds to 5300 where the setting of the attention information as the information relating to the target expressed by the representative pair is cancelled, and the process returns to 5210.

In other words, if it is determined that the target is not a low-level target in the current measurement cycle, the attention information of the objective pair stands as being set (the target is recognized as an attention target).

If it is determined that the target is a low-level target in the current measurement cycle, there is no previous-cycle pair that has a historical connection, or the attention information of the objective pair stands as being cancelled if the attention information has been cancelled in the previous-cycle pair having a historical connection (the target is recognized as a low-level target).

If it is determined that the target is a low-level target in the current measurement cycle and if attention information stands as being set in the previous-cycle pair having a historical connection, the attention information of the objective pair stands as being set if the travel distance of the own vehicle from when the target is finally determined as not being a low-level target is equal to or smaller than a predetermined distance (transfer determination value), and the attention information of the objective pair stands as being cancelled if the travel distance exceeds the predetermined distance.

[Function]

Figure 5A:
FIG. 5A is a diagram illustrating a road shape and a positional relationship between the own vehicle and a low-level target (the vehicle and the low-level target are present on a flat road).
Figure 5B:
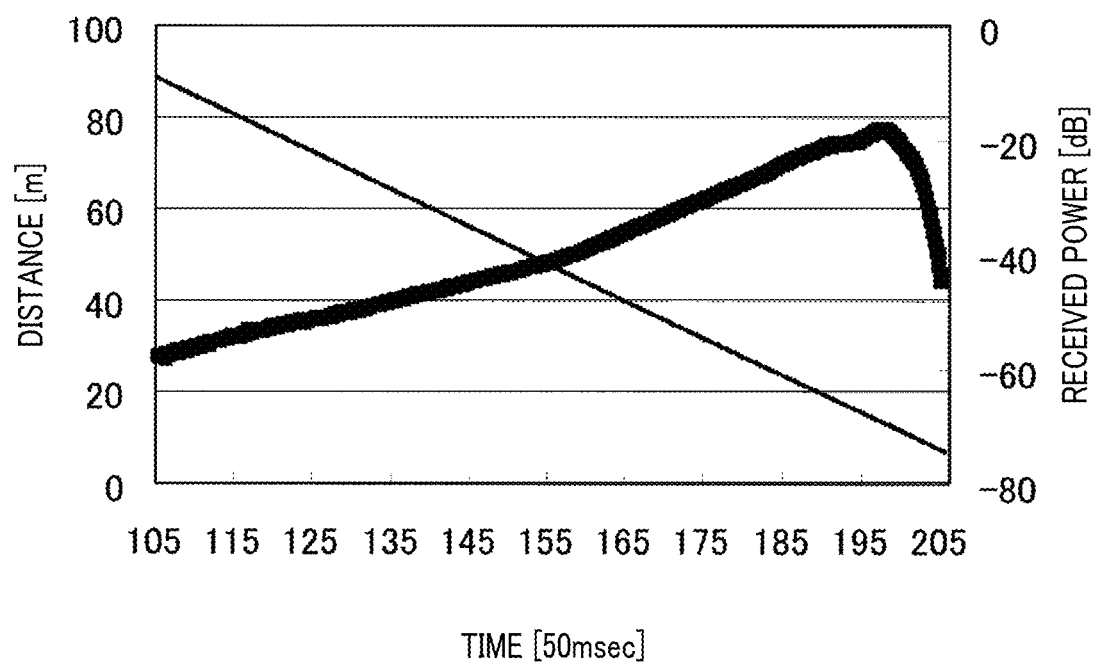
FIG. 5B is a time-series graph illustrating a distance between the vehicle and the low-level target and reception intensity of a wave reflected from the low-level target when the vehicle approaches the low-level target in the situation shown in FIG. 5A.
Figure 7A:
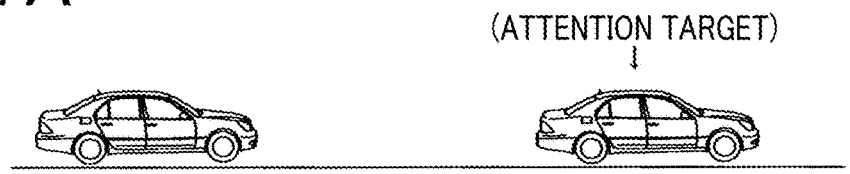
FIG. 7A is a diagram illustrating a road shape and a positional relationship between the own vehicle and a target (another vehicle) having a depth (the own vehicle and the target having a depth are present on a flat road).
Figure 7B:
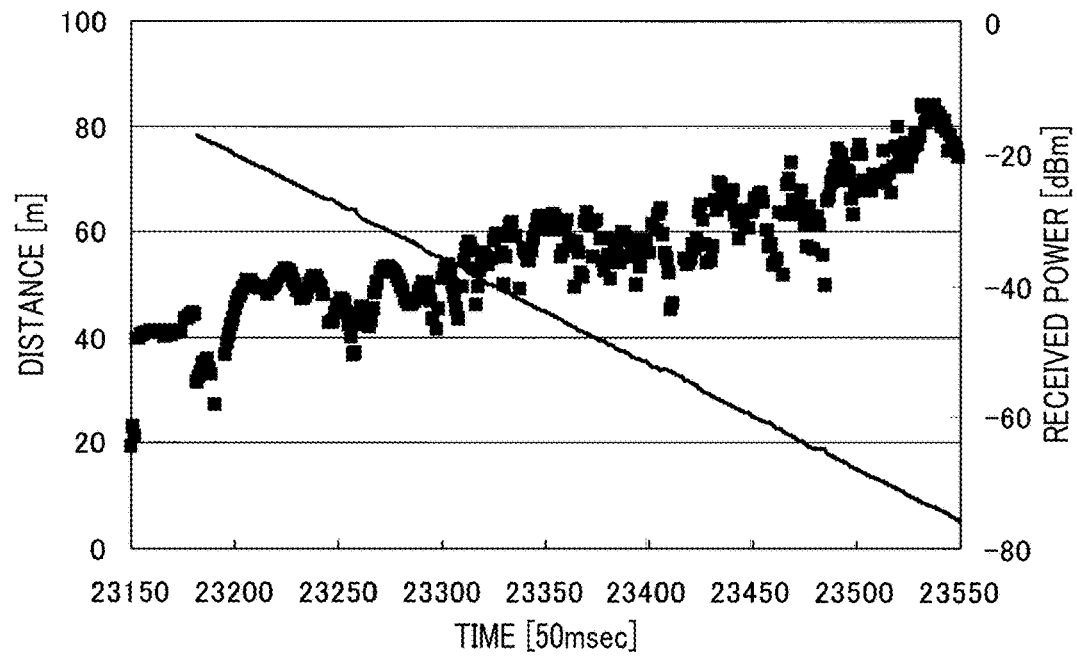
FIG. 7B is a time-series graph illustrating a distance between the vehicle and the target having a depth and reception intensity of a wave reflected from the target having a depth when the vehicle approaches the target having a depth in the situation shown in FIG. 7A.

If a target is a low-level target (such as a road-surface reflection object that can be crossed over by the vehicle) (see FIG. 5A), the reception intensity of the reflected wave from the target gradually increases as the vehicle approaches the target (see FIG. 5B). However, if the target is an attention target (object with a height that cannot be crossed over by the vehicle) (see FIG. 7A), a null point whose received power significantly decreases being influenced by multipath periodically appears (see FIG. 7B). In other words, if the vehicle constantly travels a flat road, the height of the target can be determined from the null point pattern.

Figure 6A:
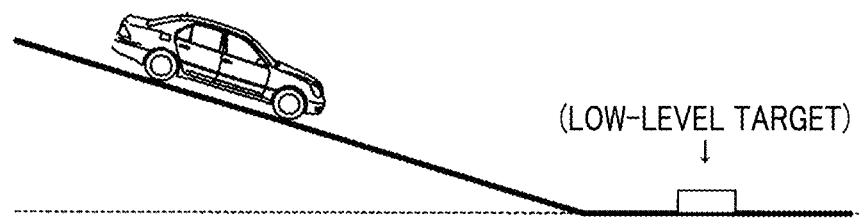
FIG. 6A is a diagram illustrating a road shape and a positional relationship between the own vehicle and a low-level target (the vehicle is on a downward slope, and the low-level target is present on a flat road ahead of the vehicle).
Figure 6B:
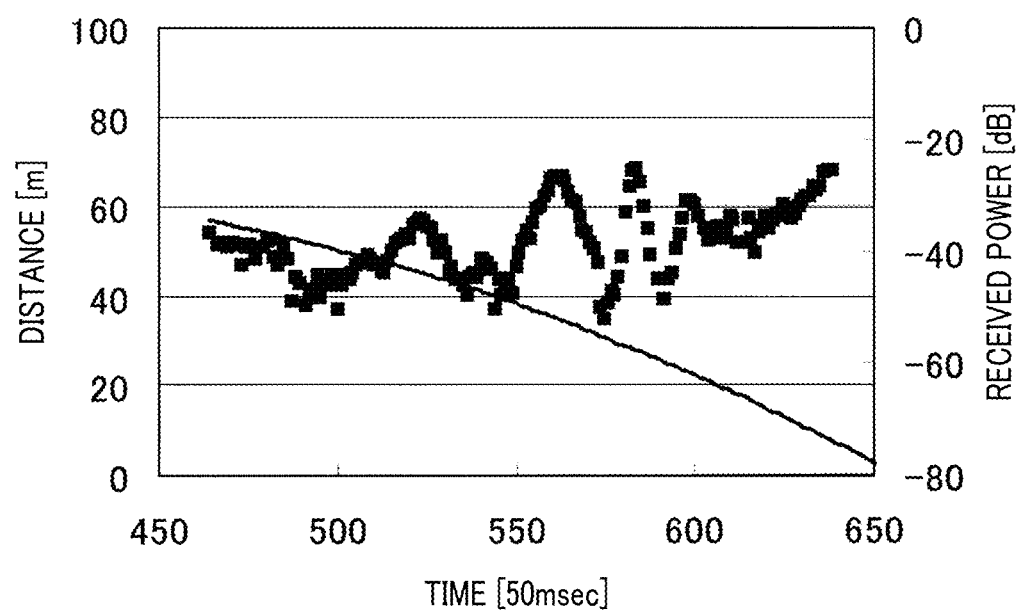
FIG. 6B is a time-series graph illustrating a distance between the vehicle and the low-level target and reception intensity of a wave reflected from the low-level target when the vehicle approaches the low-level target in the situation shown in FIG. 6A.

However, if the target is a low-level target, a null point periodically appears in the received power (see FIG. 6B) similarly to an attention target, depending on the positional relationship between the road or the own vehicle and the low-level target (e.g., see FIG. 6A), and thus whether the target is a low-level target cannot be determined from the pattern of the null points.

Figure 6C:
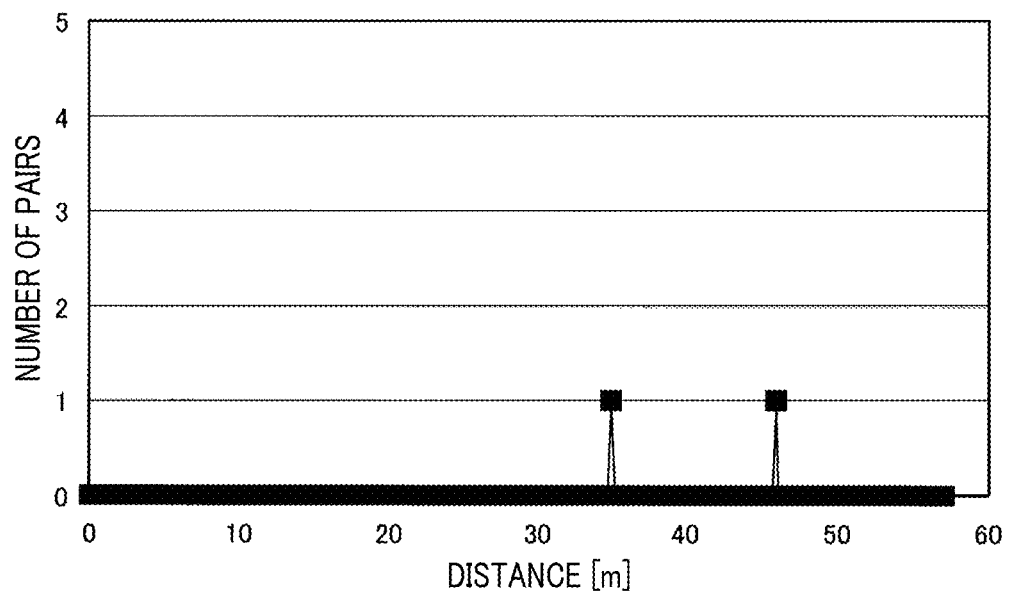
FIG. 6C is a graph illustrating change of depth determination value with respect to distance.
Figure 7C:
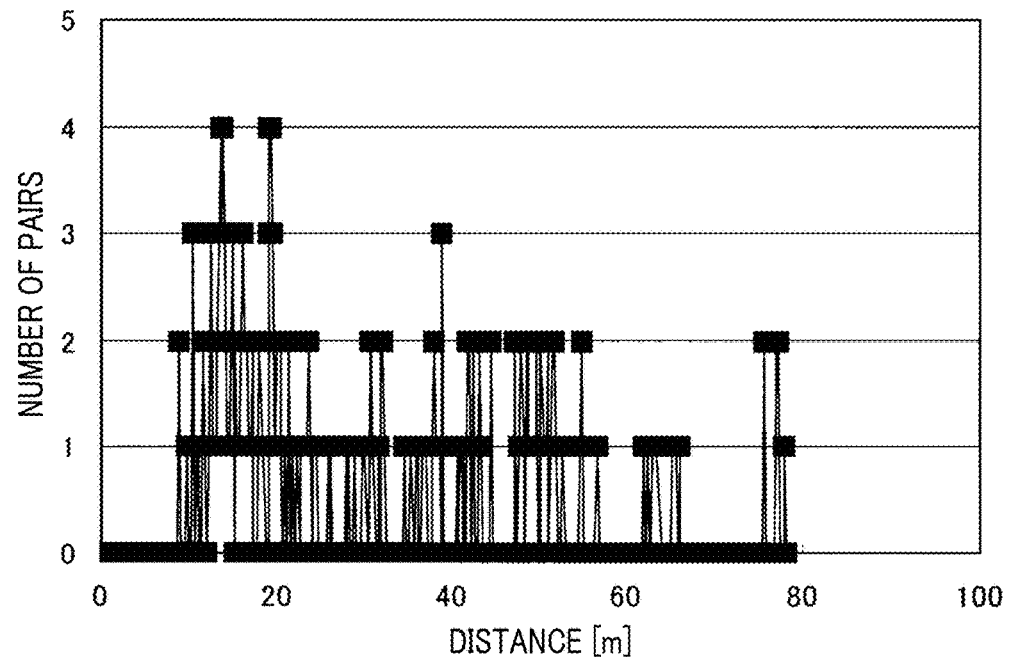
FIG. 7C is a graph illustrating change of depth determination value with respect to distance.

However, when comparison is made in terms of depth determination value, as shown in FIGS. 6C and 7C, the depth determination value of a low-level target with a small depth is 1 at the most, whereas that of an attention target, such as a vehicle with a large depth, is 2 or more. Therefore, whether the target is a low-level target can be determined by the depth determination value.

Figure 8:
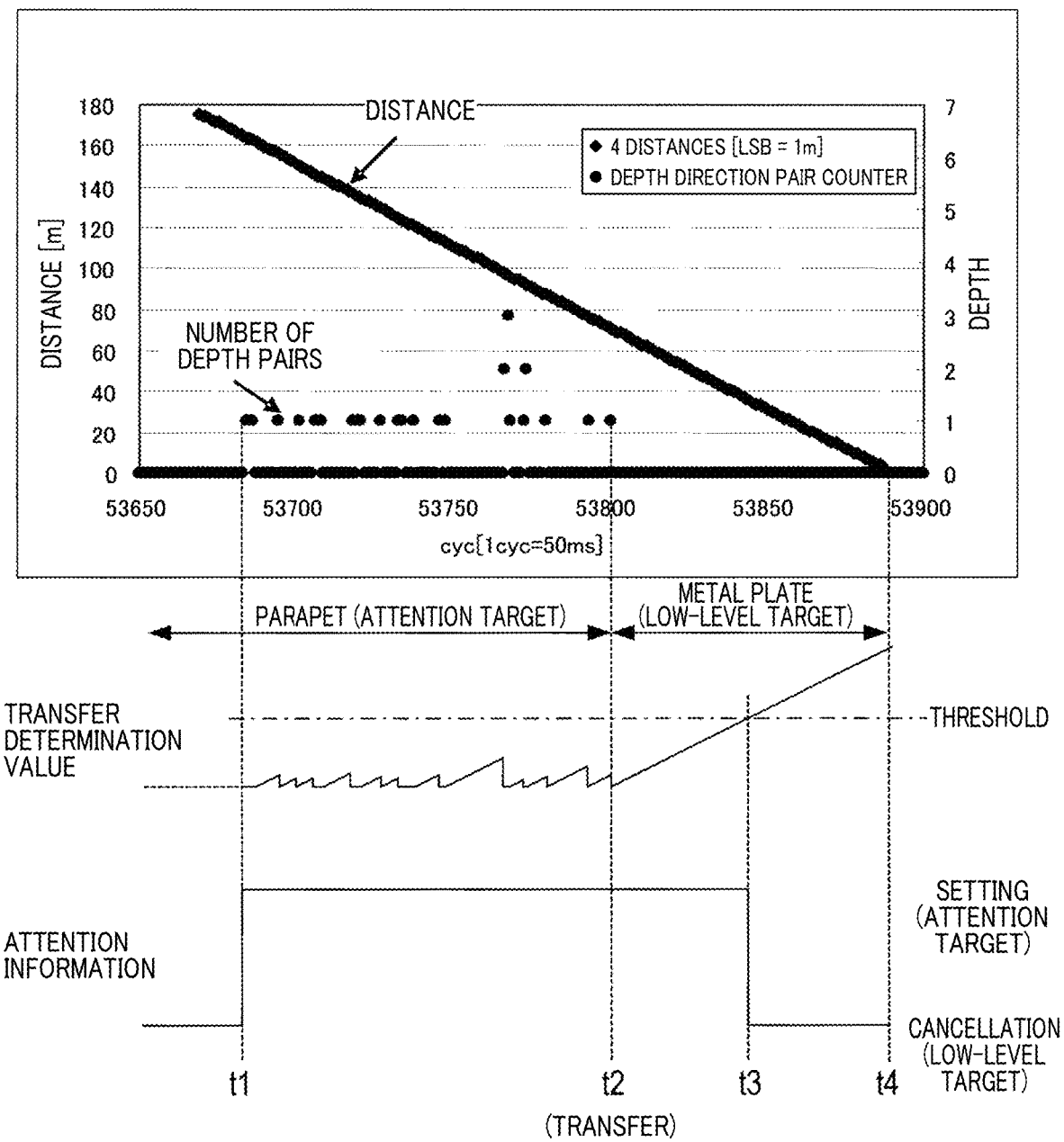
FIG. 8 is a graph illustrating distance between the vehicle and a target, and change of depth determination value, transfer determination value and identification information, when the vehicle is traveling towards a bridge and transfer occurs from a parapet to a metal plate that is a joint to the bridge.

The following description addresses the occurrence of transfer in a scene where the own vehicle travels towards a bridge and a metal plate that is a joint to the bridge is set up on the road surface, the transfer being that the information of a pair based on a parapet of the bridge is erroneously adopted by the pair based on the metal plate. In this case, as shown in FIG. 8, the metal plate is not detected from relatively a long distance but only the parapet is detected, and at a time point (time t1) when a depth pair is detected, the pair is recognized as an attention target. During the period when the depth pair is zero, the transfer determination value increases, but every time the depth pair becomes one or more, the period is reset. After that, when the metal plate is detected and the information of the parapet is adopted by the metal plate by transfer (time t2), the attention information is maintained as it has been set, but the depth pair becomes zero and thus the transfer determination value increases. When the transfer determination value exceeds the transfer determination value (time t3), the attention information is cancelled, and in that state, the vehicle reaches the position where the metal plate is set up (time t4). In other words, if the target is temporarily erroneously recognized as an attention target by transfer, the target is correctly recognized as a low-level target before the vehicle reaches the target.

Figure 9:
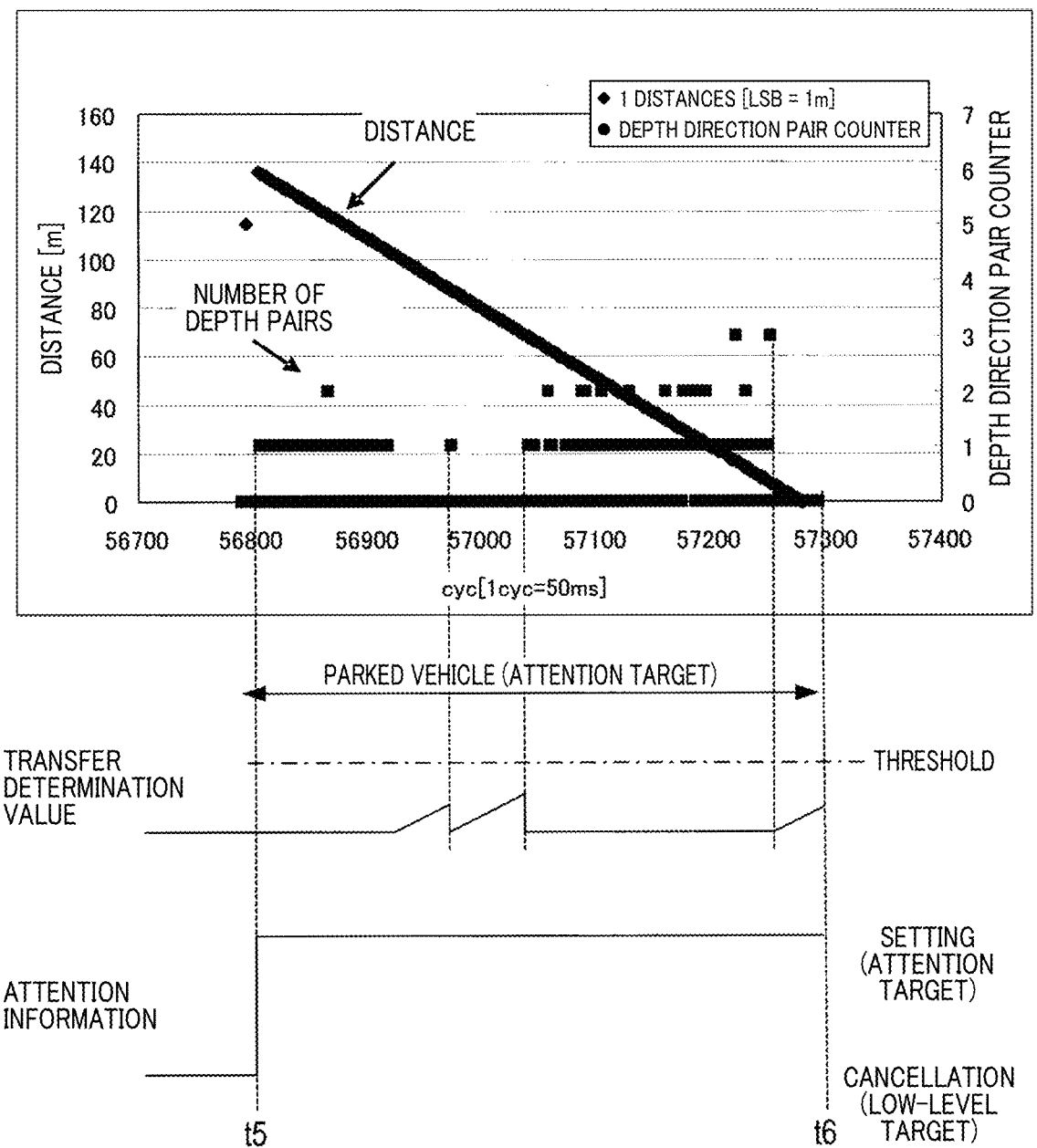
FIG. 9 is a graph illustrating distance between the vehicle and a target, and change of depth determination value, transfer determination value and identification information, when a target that cannot be crossed over (parked vehicle) is present ahead of the vehicle.
Figure 10A:
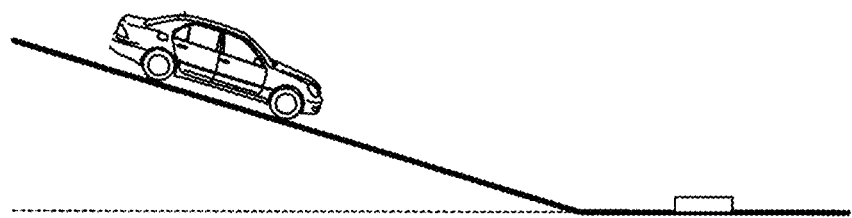
FIG. 10A is a diagram illustrating a road shape and a positional relationship between the vehicle and a low-level target.
Figure 10B:
FIG. 10B is a diagram illustrating a road shape and a positional relationship between the vehicle and a low-level target.

The following description addresses a scene where the vehicle is traveling towards a vehicle ahead that is stopped. In this case, as shown in FIG. 9, a depth pair is detected from the initial time of the detection of the vehicle (time t5), and the vehicle is recognized as an attention target. After that, until the vehicle approaches the stopped vehicle and is on the point of passing the vehicle, the depth pair is continuously detected, and the vehicle reaches the position of the stopped vehicle (time t6) while the vehicle is kept to be correctly recognized as an attention target.

As described above, according to the present embodiment, by making a determination using a depth determination value, a target can be determined as to whether it is a low-level target that can be crossed over by the own vehicle, or whether it is an attention target that cannot be crossed over by the own vehicle. Moreover, by making a determination using a transfer determination value, if wrong attention information has been adopted by a low-level target by so-called transfer, the transfer can be cancelled. As a result, accuracy is improved in the determination as to whether a target is a low-level target or an attention target. Furthermore, reliability is improved in various controls which are executed using the information of a target that has been determined as an attention target.

OTHER EMBODIMENTS

An embodiment of the present disclosure has been described so far. However, the present disclosure is not limited to the foregoing embodiment but, as a matter of course, can be implemented in various modes.

(1) The foregoing embodiment uses, as a transfer determination value, a travel distance of the own vehicle from when the target is finally determined as a low-level target. However, the transfer determination value may be elapsed time from when the target is finally determined as a low-level target.

(2) The foregoing embodiment uses, as a depth determination value, the number of stationary pairs (reflection points on a stationary object) that are present in an identification recognition range and satisfies an identification target condition. However, the depth determination value is not limited to this, but any parameter that enables acquisition of a value reflecting a depth may be used.

(3) The components of the present disclosure are conceptual and are not limited to the foregoing embodiment. For example, a function of one component may be achieved by a plurality of components, or functions of a plurality of components may be integrated into a single component. Further, at least a part of the configuration of the foregoing embodiment may be replaced by a known configuration having a similar function. Furthermore, at least a part of the configuration of the foregoing embodiment may be added to or replaced in other configurations of the foregoing embodiment.

REFERENCE SIGNS LIST

1 Radar sensor
10 Oscillator
12 Amplifier
14 Distributor
16 Transmitting antenna
20 Receiving-antenna unit
21 Receiving switch
22 Amplifier
23 Mixer
24 Filter
25 A/D converter
26 Signal processor
30 Inter-vehicle control ECU
32 Engine ECU
34 Brake ECU

The invention claimed is:

1. A target detection apparatus mounted on a vehicle, generating information relating to a target that is present in the vicinity of the vehicle, the apparatus comprising:
a radar sensor that transmits and receives a radar wave to detect a position and a speed of a reflection point that has reflected the radar wave, for each preset measurement cycle;

a target detection means that detects a target that is present in the vicinity of the vehicle, on the basis of the position and the speed of the reflection point detected by the radar sensor;

a depth determination value calculation means that determines a depth determination value indicating a depth of a target detected by the target detection means;

a crossing over determination means that determines whether a target can be crossed over by the vehicle, according to the depth determination value determined by the depth determination value calculation means;

an attention information setting means that sets attention information indicating that the target is an attention target, as one piece of information relating to the target, when the crossing over determination means determines that crossing over is not possible;

a tracking means that executes a tracking process, with a target detected by the target detection means in a latest measurement cycle being taken as a current-cycle target, and with a target detected by the target detection means in a previous measurement cycle being taken as a previous-cycle target, to determine whether a connection relationship exists between the current-cycle target and the previous-cycle target, and to cause the current-cycle target, which has been determined to have a connection relationship with the previous-cycle target, to adopt information relating to the previous-cycle target;

a transfer determination value calculation means that determines a transfer determination value measured after the crossing over determination means determines that crossing over is or is not possible, for each target after the tracking process; and an attention information cancelling means that cancels the setting of the attention information in response to determining that the transfer determination value calculated by the transfer determination value calculation means exceeds a preset transfer threshold, for a target that has adopted the information of the previous-cycle target in which the attention information has been set.

2. The target detection apparatus according to claim 1, wherein the transfer determination value is a travel distance of the vehicle.

3. The target detection apparatus according to claim 1, wherein the transfer determination value is elapsed time.

4. A target detection method adapted for a target detection apparatus mounted on a vehicle, generating information relating to a target that is present in the vicinity of the vehicle, wherein the method comprising:

transmitting and receiving a radar wave to detect a position and a speed of a reflection point that has reflected the radar wave, for each preset measurement cycle;

detecting a target that is present in the vicinity of the vehicle, on the basis of the position and the speed of the reflection point;

determining a depth determination value indicating a depth of a target;

determining whether a target can be crossed over by the vehicle, according to the determined depth determination value;

setting attention information indicating that the target is an attention target, as one piece of information relating to the target, in response to crossing over not being possible;

executing a tracking process, with a target detected in a latest measurement cycle being taken as a current-cycle target, and with a target detected in a previous measurement cycle being taken as a previous-cycle target, to determine whether a connection relationship exists between the current-cycle target and the previous-cycle target, and to cause the current-cycle target, which has been determined to have a connection relationship with the previous-cycle target, to adopt information relating to the previous-cycle target;

determining a transfer determination value measured after determining that crossing over is or is not possible, for each target after the tracking process; and cancelling the setting of the attention information in response to determining that the transfer determination value exceeds a preset transfer threshold, for a target that has adopted the information of the previous-cycle target in which the attention information has been set.

5. The target detection method according to claim 4, wherein the transfer determination value is a travel distance of the vehicle.

6. The target detection method according to claim 4, wherein the transfer determination value is elapsed time.

7. A target detection system for generating information relating to a target that is present in the vicinity of a vehicle, the system comprising:

a processor;

a non-transitory computer-readable storage medium, and a set of computer-executable instructions stored on the non-transitory computer-readable storage medium that cause the processor to implement:

detecting, for each preset measurement cycle, a position and a speed of a reflection point that has reflected a radar wave transmitted and received from a radar sensor;

detecting a target that is present in the vicinity of the vehicle, on the basis of the position and the speed of the reflection point;

determining a depth determination value indicating a depth of a target;

determining whether a target can be crossed over by the vehicle, according to the determined depth determination value;

setting attention information indicating that the target is an attention target, as one piece of information relating to the target, when crossing over is not possible;

executing a tracking process, with a target detected in a latest measurement cycle being taken as a current-cycle target, and with a target detected in a previous measurement cycle being taken as a previous-cycle target, to determine whether a connection relationship exists between the current-cycle target and the previous-cycle target, and to cause the current-cycle target, which has been determined to have a connection relationship with the previous-cycle target, to adopt information relating to the previous-cycle target;

determining whether attention information has been set for a target that has adopted the information of the previous-cycle target in which the attention information has been set;

determining a transfer determination value measured after determining that crossing over is or is not possible, for each target after the tracking process; and cancelling the setting of the attention information for the target that has adopted the information of the previous-cycle target in which the attention information has been set, in response to determining that the transfer determination value exceeds a preset transfer threshold.

8. The target detection system according to claim 7, wherein the transfer determination value is a travel distance of the vehicle from a time when determining that the target can be crossed over by the vehicle.

9. The target detection system according to claim 7, wherein the transfer determination value is an elapsed time from a time when determining that the target can be crossed over by the vehicle.

\* \* \* \* \*